Figures 1, 2:
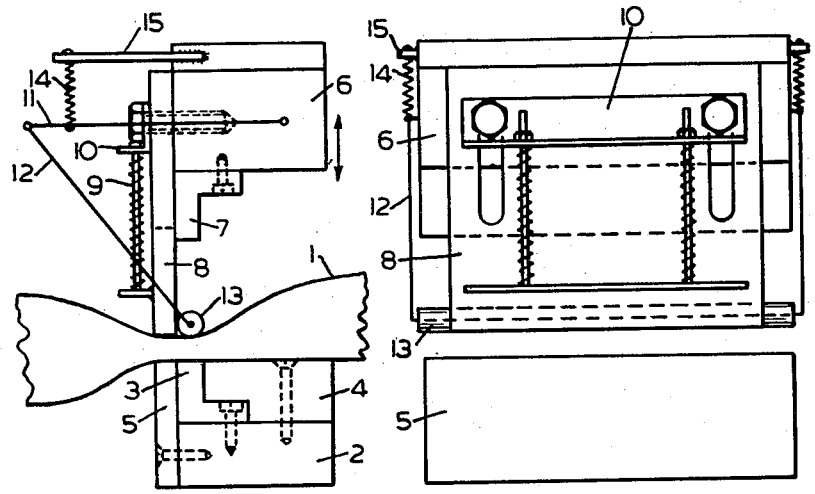

April 1, 1958   S. V. VANDEN BOSSCHE   2,828,591
PACKING OF LIQUIDS AND PASTES

Filed July 31, 1956   2 Sheets-Sheet 1

United States Patent Office 2,828,591
Patented Apr. 1, 1958

2,828,591

PACKING OF LIQUIDS AND PASTES

Sylvain Victor Vanden Bossche, Sterrebeek, Brussels, Belgium, assignor to N. V. Technische Handel Maatschappij Automaco, Amsterdam, Netherlands, a Dutch company Application July 31, 1956, Serial No. 601,265

Claims priority, application Netherlands August 3, 1955

14 Claims. (Cl. 53—39)

The invention relates to a process for packing liquids and pastes in containers made of a flexible thermoplastic material by locally compressing and cross sealing a thermoplastic tube filled with the substance to be packed, so as to divide this tube into compartments, and by separating these compartments from each other.

In a known process of this kind, the welding electrodes serve for compressing the thermoplastic tube and for pressing aside the liquid on both sides of the welding zone. As soon as the tube walls lie flat against each other, the welding is carried out by dielectrically heating the tube material. This method has the disadvantage that a liquid film is often left between the tube walls pressed against each other, so that the welding must be performed, as it were, through this liquid film. If the liquid or paste to be packed is alkaline, no satisfactory weld can be obtained in this case.

In another known process of the above kind, separate pressure members are used for pressing aside the liquid before the welding. However, these pressure members describe a link motion, whereby the pressure decreases during their movement, so that a liquid film is still left between the tube walls in many cases.

It is the object of the invention to remove the disadvantages of the above-mentioned known processes by providing an improved packing process.

It is a further object of the invention to provide means whereby the substance to be packed may be pressed away from the welding zone through a greater distance than the width of the desired weld, so that the pressure of the liquid or paste in the container may be adjusted to such a value that it does not squirt out when the container is opened.

Still another object of the invention is to provide means whereby incisions are made in the tube walls pressed against each other by the application of heat during the welding, so that the compartments may be easily separated from each other.

According to the invention, an amount of the substance to be packed is enclosed in a still open compartment by a closure member, after which a pressure member is moved over the part of the tube lying behind the closure member on a flat electrode plate, so as to press away the substance in this tube part in backward direction, and a second electrode is placed on the said tube part in order to carry out the welding.

For carrying out the process according to the invention, use may be made of a flat electrode plate over which the tube filled with the substance to be packed is displaced step by step, a carrier for a second electrode opposite to said electrode plate and movable with respect thereto, a closure member on the front side of the electrode plate, movable independently of said carrier, and a pressure member behind said closure member, movable over said electrode plate in order to press away the liquid or paste. It is of advantage to cover the upper surface of the electrode plate with a layer of an insulating material, as this makes it easier to make incisions in the thermoplastic material during the welding.

The pressure member is preferably formed as a roller, which may be rolled over the tube part lying behind the closure member. This roller may be hingedly attached by means of levers to the carrier of the second electrode and may be subjected to a downward spring pressure, so that it is automatically moved over the tube part behind the closure member during the movement of the second electrode. However, it is also possible to attach the roller by means of hinged levers to the transport device for the tube filled with the liquid or paste, in such manner that the roller is moved over the tube part behind the closure member during the return movement of the transport device. Finally, the roller may be supported by a separate carrier which makes first a downward movement, and after that a backward movement, during a suitably selected part of the cycle of operation of the device.

Preferably, the closure member is provided with a recess in which the roller is enclosed at the beginning of its backward movement, so that no liquid or paste can be enclosed between the closure member and the part of the tube which is compressed by the roller.

Figure 4:
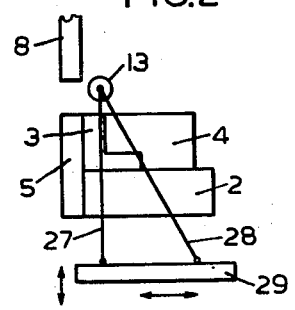
Figure 5:
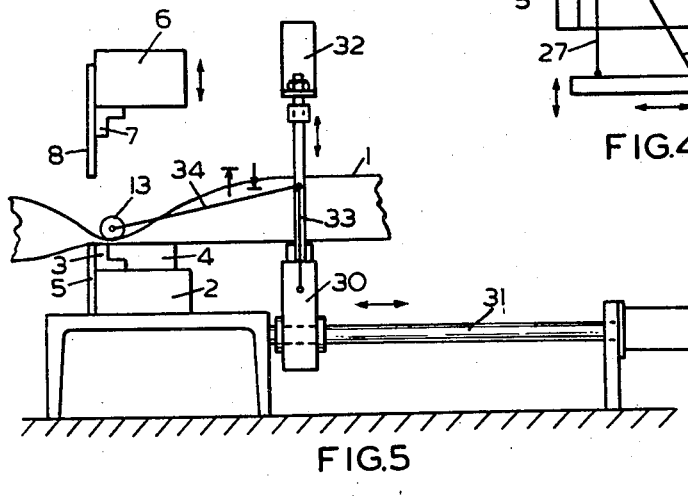
Figure 3:
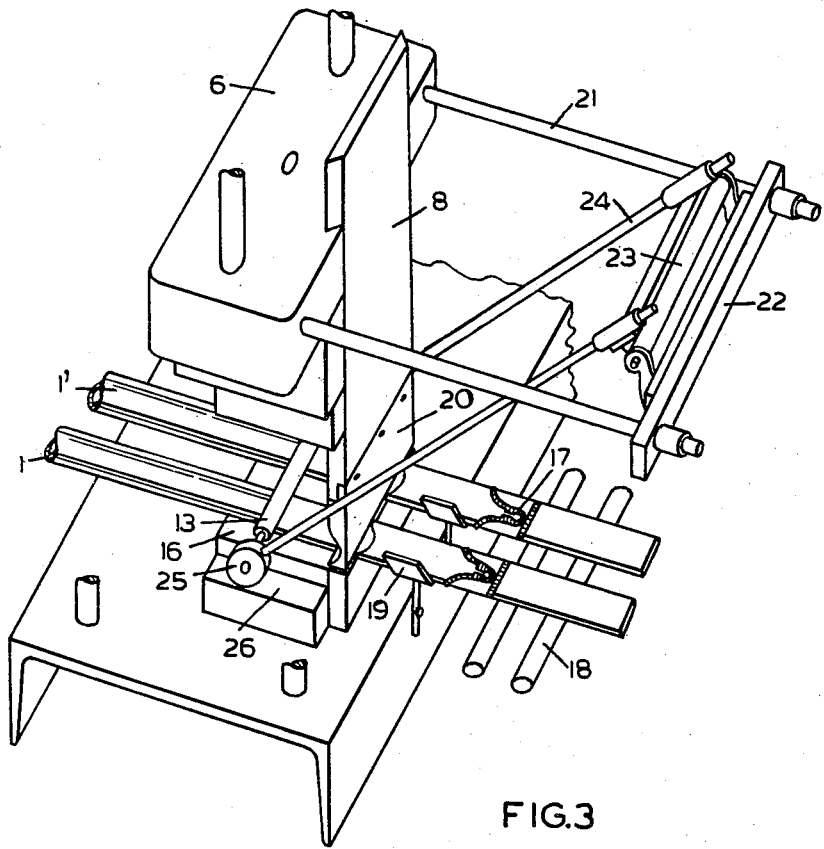

Further objects and particulars of the invention will appear from a description of some embodiments thereof with reference to the accompanying drawings, in which Fig. 1 is a side view of a device for carrying out the process according to the invention, Fig. 2 is a front view of the device according to Fig. 1, Fig. 3 is a perspective view of a device operating according to the principles indicated in Figs. 1 and 2, Fig. 4 is a schematic view of another embodiment of a device for carrying out the process according to the invention, and Fig. 5 is a schematic view of still another embodiment.

In the device shown in Figs. 1 and 2, a tube 1 filled with the liquid or paste to be packed is fed step by step (from right to left) over a flat electrode plate, consisting of a carrier 2, an electrode 3 attached to said carrier, a complementary body 4 made of an insulating material and serving to obtain a flat upper surface, and a plate 5 made of an insulating material and placed at the front of the electrode plate.

A carrier 6, to which the second electrode 7 is attached, is arranged opposite to the electrode plate, and is movable with respect to the latter. The carrier 6 may be moved in downward direction by hydraulic or pneumatic means, so that the electrodes 7 and 3 are applied against the compressed walls of tube 1.

A plate-shaped closure member 8 is slidably connected with the carrier 6 by means of a dovetail or similar connection. This closure member is supported by springs 9, connected with the closure member at their lower end, and with a supporting member 10 attached to the carrier 6 at their upper end. During the downward movement of the carrier 6, the closure member 8 first contacts the tube, whereby this closure member, in cooperation with the juxtaposed plate 5, encloses a certain amount of the liquid or paste in the forward (left-hand) part of tube 1. During the continued downward movement of carrier 6, the springs 9 are compressed.

On each side of carrier 6, there is provided a rod system, consisting of rods 11 and 12, hingedly connected with carrier 6, and supporting at its lower end a roller 13, which is rotatably supported in the ends of the rods 12. Springs 14, attached to rods 15 welded to carrier 6, exert a downward pressure on the upper rods 11. The rods 11 and 12 are hingedly connected with each other.

During the downward movement of carrier 6, and after the closure member 8 has contacted the tube, the roller 13 is forcedly moved to the right, whereby the liquid in the part of the tube 1 to the right of the closure member 8 is pressed away. When the electrode 7 contacts the tube, all liquid or paste has been removed therefrom by the action of roller 13.

The device shown in Fig. 3 is based on the same principles as the device according to Figs. 1 and 2, but has been somewhat modified in detail.

Fig. 3 shows two tubes 1 and 1', filled with the liquid or paste to be packed and fed step by step over a flat electrode plate 16 from left to right by a transport device (not shown). A completed weld 17 is shown at the right; the tube which has been divided into compartments is led away over transport rollers 18. Supporting members 19 support the tube on its way to the transport rollers 18.

As in the embodiment shown in Figs. 1 and 2, the plate-shaped closure member 8 is slidable in the carrier 6 by means of a dovetail connection. The lower part 20 of the closure member is made of an insulating material. The manner in which the closure member is moved in downward direction independently of the carrier 6 has not been indicated in Fig. 3. For this purpose, the closure member may be resiliently supported by the carrier, as shown in Figs. 1 and 2, or a separate hydraulic or pneumatic device may be used for driving the closure member.

Two rods 21, interconnected by a bar 22, are attached to the carrier 6. A spring 23 of the kind used for closing doors is attached to the bar 22 and exerts a downward pressure on two rods 24. Supporting members 25, slidable along a lowered part 26 of the electrode plate 16 and supporting the pressure roller 13, are attached to the lower ends of rods 24.

The operation of the device shown in Fig. 3 is the same as that of the device according to Figs. 1 and 2, and will be summarily described for the sake of clarity.

As soon as the filled tube has been moved through one step, the pressure member 8 moves in downward direction and closes the tube. The carrier 6 is then moved in downward direction, and the roller 13 is rolled in backward direction over the tube lying on the electrode plate 16 and presses away all the liquid or paste, so that the tube part in question is completely empty at the moment at which the top electrode contacts the tube. A high frequency voltage is now applied between the two electrodes, whereby the tube walls that have been pressed against each other are dielectrically heated and welded together according to an outline determined by the shape of the upper electrode. After that, the closure member 8 and the carrier 6 move in upward direction, and the tubes 1 and 1' are again displaced by the transport device (not shown).

In addition to the advantage that all liquid or paste is always removed from the tube part to be welded, the above-described device has still a further advantage: due to the use of a flat electrode plate, incisions may be made by means of dielectric heating during the welding, for instance in the shape of a perforation, without any objections. For this purpose, the upper electrode is provided with a dull knife edge projecting some tenths of a mm. from the electrode surface and pressed into the tube material during the welding, so that the material is cut through at the spots in question. In devices, wherein the welding electrodes serve at the same time for pressing aside the liquid, this method has proved impracticable.

The electrode plate, over which the tube is fed, need not comprise a sharply defined electrode part as shown in Fig. 3, which corresponds with the shape of the upper electrode. It is also possible to use a conductive plate as a lower electrode: in order to prevent a voltage breakdown, this plate is preferably covered with a dielectric material, such as Pertinax. This construction has the advantage that a thermoplastic tube with a smaller wall thickness may be used for packing a given material, or that materials that are more difficult to handle may be packed in a tube with a given wall thickness. In view of the larger distance between the electrodes, the high frequency energy has to be increased, however, whereby the temperature of the upper electrode is also increased. For this reason, it is sometimes necessary to cool the upper electrode, which may be done by leading through an air current, or an insulating liquid.

Fig. 4 schematically shows an embodiment of the device according to the invention, wherein the roller 13 serving for pressing away the liquid is supported by means of rods 27 and 28 by a member 29, which makes first a downward movement and then a backward movement during the downward movement of the upper electrode. These movements of the member 29 may be obtained by hydraulic or pneumatic means controlled by the timing units which also control the operation of the device as a whole.

In the embodiment schematically shown in Fig. 5, the movement of the roller 13 is controlled by the feeding device displacing the tube 1 step by step. This feeding device consists of a member 30 which may be moved forward and backward along a rod 31, and a second member 32 which may be let down onto the member 30 so that the tube is clamped between members 30 and 32. The transport of the tube is performed in such manner that the member 30 is first moved in backward direction, after which the members 30 and 32 clamp the tube, and the member 30 moves in forward direction together with the tube. The roller 13 is attached by means of rods 33 and 34 to the member 30, whereby the roller is drawn over the tube part behind the closure member during the return movement of the feeding device. As schematically indicated by arrows, means are provided to lift the roller during the forward movement of the feeding mechanism, and to exert a downward force on the roller during the return movement.

In order to prevent an amount of the liquid or paste from being enclosed between the closure member 8 and the roller 13, so that it could not be removed by the roller, it is preferred in all the above-described embodiments to provide a recess in the closure member, in which the roller is enclosed at the end of the downward movement of the closure member.

Although the invention has been described hereinbefore with reference to some specific embodiments thereof, it is to be understood that these embodiments may be modified in many ways within the scope of the invention as set forth in the appended claims.

It should be emphasized that the expression "flat electrode plate" has been used in the specification and in the appended claims to include not only a completely flat electrode plate, but also one having some portions, e. g. those corresponding to and cooperating with the second electrode, which project somewhat (say some tenths of a millimetre) above the remainder of the surface of the electrode plate. Use will then be made of a roller having a sufficient resiliency, e. g. a roller made from rubber or similar material.

I claim:

1. A process for packing a liquid or paste, comprising the steps of displacing a tube made of a flexible thermoplastic material, and filled with the substance to be packed, step by step over a flat electrode plate, enclosing an amount of the substance to be packed in said tube by means of a closure member at the front of said electrode plate, moving a pressure member over the part of said tube lying on said electrode plate in order to remove therefrom the said substance, placing a second electrode on said tube part in order to cross seal the tube, so as to obtain a closed compartment, and separating the said closed compartments from each other.

2. A process as claimed in claim 1, wherein incisions are made in the walls of the thermoplastic tube when pressed together by the application of heat, so that the compartments may be easily separated from each other.

3. A device for packing a liquid or paste, comprising a flat electrode plate, means for displacing a thermoplastic tube filled with the substance to be packed step by step over said electrode plate, a second electrode, a carrier for said second electrode placed opposite to said electrode plate and movable with respect thereto, a closure member on the front side of said electrode plate and movable independently of said carrier, and a pressure member behind said closure member and movable over said electrode plate in order to press away the substance to be packed.

4. A device as claimed in claim 3, wherein the said pressure means is formed as a roller adapted to be rolled over the tube part behind said closure member.

5. A device as claimed in claim 3, further comprising a plurality of levers hingedly attached to said carrier and supporting said pressure member, and means for exerting a downward spring pressure on said levers.

6. A device as claimed in claim 3, further comprising a plurality of hinged levers attached to said displacing means and supporting said pressure member.

7. A device as claimed in claim 3, further comprising a second carrier supporting said pressure member, and means for causing first a forward movement and then a backward movement of said second carrier during each cycle of operation of the device.

8. A device as claimed in claim 3, further comprising a plate attached to the front of said electrode plate forming an abutment for said closure member.

9. A device as claimed in claim 3, wherein a recess is provided in said closure member for enclosing said pressure member at the beginning of its backward movement.

10. A device as claimed in claim 3, wherein the said electrode plate comprises a plate-shaped electrode covered with a layer of an insulating material.

11. A device as claimed in claim 3, further comprising a plurality of dull knife edges projecting from the surface of said second electrode through a small distance.

12. A device as claimed in claim 3, wherein the said closure member is slidably supported by said carrier by means of a dovetail connection.

13. A device as claimed in claim 3, further comprising means whereby said closure member is resiliently supported by said carrier.

14. A device as claimed in claim 3, wherein the lower part of said closure member is made of an insulating material.

References Cited in the file of this patent

UNITED STATES PATENTS

| | | |
|---|---|---|
| 2,430,995 | Roos | Nov. 18, 1947 |
| 2,618,814 | Paton et al. | Nov. 25, 1952 |
| 2,764,862 | Rado | Oct. 2, 1956 |